United States Patent Office 3,061,156
Patented Oct. 30, 1962

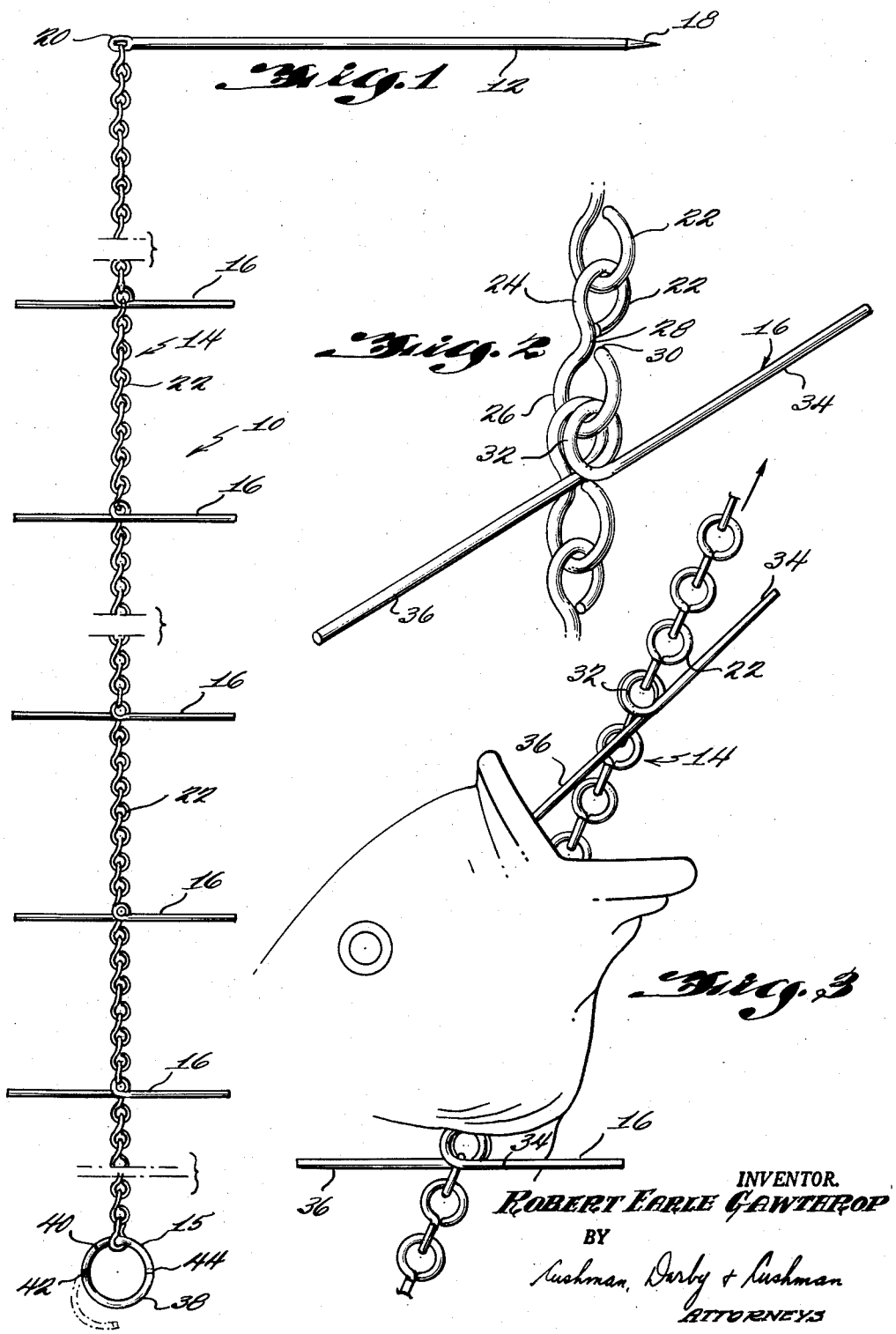

3,061,156
FISH STRINGER
Robert Earle Gawthrop, Drawer R, Pearisburg, Va.
Filed Feb. 5, 1962, Ser. No. 171,033
5 Claims. (Cl. 224—7)

The present invention relates to a new and improved fish stringer and, more particularly, to an improved fish stringer of the type capable of individually supporting a plurality of fish in spaced relationship to each other.

Fish stringers have been heretofore constructed with a line having a needle carried on one end thereof and a cross-bar or retaining member carried on the other end thereof. Such prior fish stringers were designed to carry a plurality of fish, the needle being inserted through the gill or mouth of the first fish, the fish then being threaded on the line until it engaged the cross-bar or supporting member at the other end of the line. Subsequent fish strung on the line were supported by engagement with the previous fish strung on the line and while such stringers provided adequate means of carrying the fish, it is obvious that the fish were crowded and could not be kept alive during a day's fishing trip even though the stringer was supported with the fish in the water.

Heretofore, fish stringers have been made to individually support the fish as they are caught in an effort to hold them in spaced relationship to each other to prevent jamming and/or injury to the fish. In this latter type of fish stringer, individual hooks or holders were connected to a line and the fish had to be individually strung on each holder and the holder locked to the line.

An important object of the present invention is to provide a new and improved fish stringer for holding a plurality of fish in spaced relationship on a line threaded through the fish without danger of crowding or killing the fish during a day's fishing trip.

Another important object of the present invention is to provide a fish stringer line having a plurality of support means thereon, each for individually supporting a fish, the support means being such that they can be threaded with the stringer line through the fish without damage to the fish or they can be arranged to support the fish when the fish has been threaded on the line to a desired position.

Still another object of the present invention is to provide a fish stringer having a needle on one end thereof capable of piercing the fish through the gill or mouth when used for threading the fish onto the string or line and also capable of use for anchoring the stringer by sticking the same into a log, base of a tree or the ground along a creek, lake or river bank.

A further object of the present invention is to provide an improved fish stringer having a needle on one end thereof for threading the stringer line through the fish, a plurality of support means carried by the string or line in spaced relationship to each other and an enlarged snap-ring at the other end of the string capable of being hooked to any desired point of attachment when it is desired to anchor or carry a string of fish.

Another object of the present invention is to provide a fish stringer with a plurality of support means for individually supporting fish in spaced apart relationship, each of the support means being capable of easy removal or attachment to the line.

These and other objects and advantages of the present invention will appear more fully in the following specification, claims and drawings in which:

FIGURE 1 illustrates a side elevational view of the stringer of the present invention;

FIGURE 2 is an enlarged fragmentary perspective view of a portion of the fish stringer of FIGURE 1 and illustrating the attachment of the individual fish supporting rod elements, and FIGURE 3 is an enlarged perspective view illustrating a fish being strung on the stringer of the present invention, the view showing one of the fish supporting rod elements in a substantially parallel alignment with the length of the string or line and passing through the fish's mouth and another of the rod elements in a substantially transverse fish-supporting position with respect to the string or line.

Referring now to the drawings wherein like character or reference numerals represent like or similar parts, the fish stringer of the present invention is generally designated by the numeral 10. As best shown in FIGURES 1 and 2, the fish stringer 10 includes an elongated slender needle 12 attached to one end of a stringer line 14 and a ring member 15 attached at the other end of the stringer line 14. Positioned intermediate the needle 12 and the ring member 15 and pivotally secured to the stringer line 14 are a plurality of spaced-apart, rod elements 16 for supporting fish in spaced-apart relationship along the line 14.

In more detail, the elongated needle 12 is provided with a sharpened point 18 at one end thereof and an eye 20 at the other end thereof for attachment to the line 14. In stringers heretofore used, the needle 12 has been utilized to pass through the gill and mouth of a fish after which the fish is threaded onto the stringer line 14. While it is the usual practice to pass the needle through the gill and mouth of the fish, it will also be understood that the needle may be used to pierce the lip of the fish to thread the line through the same. In the present invention, the needle 12 is constructed of a hradened spring steel so that it may have the further function of being capable of sticking into a log or tree or into the bank of a river or lake so that the stringer can be supported. Prior needles used for stringers would bend and break and be ineffective for their primary use if utilized in the manner described above.

The stringer line 14 is preferably a flexible chain made up of a plurality of interconnected galvanized links 22. As best shown in FIGURE 2, the links 22 of the chain are each formed in the shape of a figure 8 so as to have an upper eye 24 and a lower eye 26. The upper eye 24 lies in a plane substantially 90° to the plane of the lower eye 26 so that when the links 22 are assembled together to form the chain, the chain is completely flexible. If desired, each link 22 may be welded at its ends 28 and 30 after the links have been assembled into the chain, this construction being utilized when the chain is to be used to support large heavy fish.

The fish-supporting rod elements 16, mentioned above, are pivotally attached to the chain at a point intermediate their end portions in order that they may normally extend transversely of the length of the chain, as shown in FIGURE 1, for supporting the fish or they may be pivoted to a position substantially parallel to the length of the chain in order that they may be threaded through the gill and out of the mouth of the fish, as shown in FIGURE 3. In more detail, each of the rod elements is preferably made from a single piece of wire having sufficient stiffness to support the weight of a fish. The wire is constructed into the rod element 16 by coiling the same intermediate of its length to provide a coiled loop 32 defining an eye. The end portions 34 and 36 on either side of the loop 32 are substantially the same length and have sufficient flexibility to enable the coil of the loop to be separated, thus permitting insertion of the loop into one of the eyes 24 or 26 of the links 22. As will now be apparent, the rod elements 16 are capable of easy movement from a position transverse to the chain 14 to a position substantially parallel with the chain 14.

The ring member 15 supported through an eye of the link 22 at the opposite end of the chain from the needle 12 is constructed as a split ring having one arcuate portion 38 and a second arcuate portion 40 pivotally connected thereto at 42. The free ends of the ring are provided with intermeshing surfaces 44 so that the ring member 15 can be opened or snap-locked in a closed position. The ring member 15 may be utilized to support the stringer from any suitable attachment such as a belt loop on a fisherman's jacket or it may be used as a means to shorten the chain 14 when actually carrying the fish by threading the needle through the loop in the ring and drawing the chain up in loop fashion.

Referring now to FIGURE 3 of the drawings, the fish stringer of the present invention is utilized in the following manner. First, the needle 12 is used to pierce through the gill and out of the mouth of the fish in order to draw or thread the fish onto the chain or line 14. As the fish approaches the uppermost rod element 16, this element is grasped by the fisherman so that it pivots to the position shown in the upper portion of FIGURE 3 which is substantially parallel to the length of the chain. It is then passed through the gill and out of the mouth of the fish as the fish is threaded onto the chain. This step of grasping the rod elements 16 to move it to a position substantially parallel with the chain is repeated as each rod element 16 is approached so that the fish can slide down the chain until it reaches the lowermost rod element 16. The lowermost rod element 16 is maintained in its transverse position relative to the length of the chain and thus will engage underneath the gills to support the fish on the chain. By having the rod elements 16 spaced along the chain, it will now be obvious that the fish as they are caught and placed along the chain are spaced from one another and thus the fisherman avoids crowing the fishing and is able to maintain the fish alive by supporting the stringer in the water.

While the threading of the fish has been described as inserting of the needle beneath the gill and out of the mouth, it will, of course, be obvious to those skilled in the art that the needle could be used to pierce the lip of the fish and the chain threaded through the lip.

The advantages and objects of the present invention have been fully satisfied by the device disclosed in the drawings and described hereinbefore. However, certain modifications of the invention may be made without departing from the spirit of the invention and, therefore, the terminology used in this specification is for the purpose of description and not limitation, the scope of the invention being defined in the claims.

What is claimed is:

1. An improved fish stringer comprising: an elongated flexible chain constructed of a plurality of links, each of said links being made of a rigid material and having at least one eye, and a plurality of individual fish supporting rod elements attached to said chain along the length thereof in spaced apart relationship to each other, each of said rod elements including a stiff piece of wire having a coiled loop defining an eye intermediate substantially aligned straight end portions thereof, said loop of each wire being received in the eye of one of the links of said flexible chain whereby the rod element is capable of rotation into parallel alignment with the length of said chain when stringing a fish thereon and is capable of rotation to a position transverse of the length of said chain for supporting a fish thereon.

2. An improved fish stringer comprising: an elongated flexible chain constructed of a plurality of links, each of said links being made of a rigid material and having at least one eye, an elongated needle attached to one end of said chain for stringing the chain through a fish, said needle being constructed of a hardened spring steel, and a plurality of individual fish supporting rod elements attached to said chain along the length thereof in spaced apart relationship to each other, each of said rod elements including a stiff piece of wire having a coiled loop defining an eye intermediate substantially aligned straight end portions thereof, said loop of each wire being received in the eye of one of the links of said flexible chain whereby the rod element is capable of rotation into parallel alignment with the length of said chain when stringing a fish thereon and is capable of rotation to a position transverse of the length of said chain for supporting a fish thereon.

3. An improved fish stringer comprising: an elongated flexible chain constructed of a plurality of links, each of said links being made of a rigid material and having at least one eye, an elongated needle attached to one end of said chain for stringing the chain through a fish, said needle being constructed of a hardened spring steel, an enlarged ring member attached to the other end of said chain, and a plurality of rod elements attached to said chain along the length thereof in spaced-apart relationship to each other, each of said rod elements including a stiff piece of wire having a coiled loop defining an eye intermediate substantially aligned straight end portions thereof, said loop of each wire being received in the eye of one of the links of said flexible chain wherein the rod element is capable of rotation into parallel alignment with the length of said chain when stringing a fish thereon and is capable of rotation to a position transverse of the length of said chain for supporting a fish thereon.

4. The improved fish stringer of claim 3 wherein said enlarged ring member is a snap ring including two arcuate portions pivoted to each other and having free ends capable of snap-lock engagement.

5. The improved fish stringer of claim 3 wherein the wire of said rod elements has sufficient flexiblity to enable said straight end portions thereof to be urged apart so that the loop of the wire can be fitted onto and removed from one of the links of said chain.

References Cited in the file of this patent
UNITED STATES PATENTS
2,959,333    Baggett _____ Nov. 8, 1960